United States Patent

Nakanishi et al.

[11] Patent Number: 6,144,505
[45] Date of Patent: Nov. 7, 2000

[54] OPTICAL COMPONENT, METHOD OF MOLDING OPTICAL COMPONENT, AND MOLD FOR OPTICAL COMPONENT

[75] Inventors: Hiroshi Nakanishi, Tokyo; Kaoru Okitaka, Ebina; Yoichi Shibata, Tochigi-ken, all of Japan

[73] Assignee: Canon Kabushiki Kaisha, Tokyo, Japan

[21] Appl. No.: 09/288,232

[22] Filed: Apr. 8, 1999

[30] Foreign Application Priority Data

Apr. 13, 1998 [JP] Japan ................................. 10-101611
Mar. 11, 1999 [JP] Japan ................................. 11-065330

[51] Int. Cl.$^7$ ........................................... G02B 7/02
[52] U.S. Cl. .................... 359/811; 359/819; 359/805; 264/1.32
[58] Field of Search .................... 359/805, 811, 359/819, 820, 822; 264/296, 267, 269, 271.1, 1.32

[56] References Cited

U.S. PATENT DOCUMENTS

| | | | |
|---|---|---|---|
| 5,286,419 | 2/1994 | Van Ligten et al. | 264/1.32 |
| 5,329,406 | 7/1994 | Nakanishi et al. | 359/811 |
| 5,434,707 | 7/1995 | Dalzel et al. | 264/1.32 |
| 5,694,256 | 12/1997 | Winkler | 359/805 |
| 5,788,910 | 8/1998 | McNelis et al. | 264/296 |
| 5,808,817 | 9/1998 | Miyamoto et al. | 359/819 |

*Primary Examiner*—Loha Ben
*Attorney, Agent, or Firm*—Fitzpatrick, Cella, Harper & Scinto

[57] ABSTRACT

This invention provides an optical component free from weld formation in its optical surface and having an excellent optical performance, a method of molding an optical component, and a mold for molding an optical component. For this purpose, an optical component as a plastic molded product having an optical function, is formed with a molding surface with a shape of a curved surface, and a flange portion between the molding surface and a gate portion. At least part of a surface constituting the flange portion is molded by injecting a molten resin along a wall surface that forms an angular difference of 15° or less which is substantially equal to a tangential angle to the curvature of the curved surface of the molding surface, which is near the flange portion.

16 Claims, 17 Drawing Sheets

OPTICAL COMPONENT, METHOD OF MOLDING OPTICAL COMPONENT, AND MOLD FOR OPTICAL COMPONENT

BACKGROUND OF THE INVENTION

The present invention relates to an optical component having an optical surface molded by using a mold, a method of molding an optical component, and a mold for an optical component.

A mold can manufacture an optical component having a specific surface such as an aspherical surface with good productivity and at a low cost. By using this advantage, such an optical component is conventionally formed by using a mold. An example of such an optical component includes a lens for an optical scanning system, e.g., a laser printer or digital copying machine, or for a reading optical system, e.g., a facsimile apparatus or copying machine; and a lens, a mirror, a prism, and the like for a mirror image sensing optical system, a finder optical system, and an auto-focus optical system.

To mold an optical component by using, e.g., a plastic, a mold 101 as shown in FIG. 14 is used to obtain a molded product 102 as shown in FIG. 15. The molded product 102 is cut at its gate molding portion 103 to obtain, in the example of FIG. 15, a meniscus convex lens 105 having a flange 104 as an optical component.

A stationary side template 107 is attached to a stationary side mounting plate 106 of the mold 101 connected to an injection apparatus (not shown). A movable side template 109 for forming a cavity 108 corresponding to the meniscus convex lens 105 together with the stationary side template 107 is fixed to a movable side mounting plate 112 through a pressure spacer 110 and a spacer block 111. An ejector plate 113 is accommodated between the pressure spacer 110 and movable side mounting plate 112 connected to a mold locking apparatus (not shown), and is movable toward the stationary side template 107. Ejector pins 114 extend from the ejector plate 113 to be slidable through the pressure spacer 110 and movable side template 109. The distal end faces of the ejector pins 114 oppose a cavity (this constitutes the peripheral portion of the cavity 108 of the meniscus convex lens 105 and will be referred to as the second cavity hereinafter to distinguish it from the cavity 108 having an optical surface) 115 and a sprue 116.

The mold 101 is adjusted to a predetermined temperature. Molten plastic is supplied from the injection apparatus to the mold 101 through the sprue 116 formed in the stationary side mounting plate 106 and template 107, and flows through a runner 117 and a gate 118 to fill the cavity 108 through the second cavity 115. After that, the plastic in the cavity 108 is cooled, the movable side template 109 is separated from the stationary side template 107, and the ejector plate 113 is moved forward toward the stationary side template 107, so that the molded product 102 shown in FIG. 15 is ejected from the movable side template 109 through the ejector pins 114.

In addition to the gate molding portion 103 described above, the meniscus convex lens 105 having the flange 104 of the molded product 102 is integrally formed with a runner molding portion 119 and a sprue molding portion 120 continuous to the gate molding portion 103. When the molded product 102 is cut at its gate molding portion 103, the meniscus convex lens 105 having the flange 104 can be obtained.

When the meniscus convex lens 105 is to be obtained from the molded product 102 as shown in FIG. 15, conventionally, an outer appearance defect called a weld is sometimes formed on the surface of a convex optical surface 121 of the meniscus convex lens 105 close to the gate molding portion 103. How the weld is formed will be described with reference to FIGS. 16 and 17.

FIGS. 16 and 17 show how molten plastic 122 flows from the gate 118 to the cavity 108 through the second cavity 115. When the molten plastic 122 is molded using the mold 101 shown in FIG. 14, it is cast into the cavity 108 through the sprue 116, runner 117, and gate 118. Conventionally, the runner 117, gate 118, and second cavity 115 are linear, i.e., are linearly aligned in a direction perpendicular to the optical axis of the meniscus convex lens 105. As shown in FIG. 16, the molten plastic 122 entering the second cavity 115 comes into contact with a concave optical surface molding surface 123 of the cavity 108 and then flows into the cavity 108 along the concave optical surface molding surface 123. After the molten plastic 122 fills the cavity 108 to a certain degree, as shown in FIG. 17, the molten plastic 122 flowing along the concave optical surface molding surface 123 extends to come into contact with a convex optical surface molding surface 124 corresponding to the convex optical surface 121 at a portion indicated by an arrow A in FIG. 17. At this time, this portion of molten plastic 122 overlaps a distal end portion B of its another portion which flows along the convex optical surface molding surface 124 from the beginning.

In this case, the molten plastic 122 flowing along the concave optical surface molding surface 123 to come into contact with the convex optical surface molding surface 124 at the portion indicated by the arrow A and the molten plastic 122 flowing along the convex optical surface molding surface 124 from the beginning are deprived of heat by the stationary and movable side templates 107 and 109, and their viscosity has accordingly increased. For this reason, at a portion indicated by an arrow C, these two flows of the molten plastic 122 do not merge but form a thin parting line. This parting line is the weld.

More specifically, referring to FIG. 16, when molding is to be performed by using the mold 101, flange portions which continue from the concave optical surface molding surface 123 with a size D2 and have sizes D1 and D3 are formed, so that a line segment L1 as a tangent to the curvature of the cavity portion that molds the concave optical surface molding surface 123 makes an angle $\alpha$ of 15° or more with a line segment L2 extending from the flange portion. Since the flange and gate portions are linear, i.e., linearly aligned in a direction perpendicular to the optical axis of the meniscus convex lens 105, the weld described above is formed.

SUMMARY OF THE INVENTION

When a weld as described above is formed on the optical surface of an optical component, refraction of light changes at the weld portion, which is sometimes very inconvenient in terms of the optical performance of the optical component.

In order to prevent this, when casting the molten plastic 122 into the mold 101, conventionally, the temperature of the mold 101 is set rather high so as not to allow the molten plastic 122 to cool down. The flows of the molten plastic 122 are merged at the portion of the parting line (described above) indicated by the arrow C in FIG. 17, so a weld is not formed on the optical surface (the convex optical surface molding surface 124 in the case of FIG. 17). After that, the temperature of the mold 101 is decreased to cool the plastic filled in the cavity 108.

In another method, the flow rate with which the molten plastic 122 is cast from the gate 118 to the second cavity 115 and cavity 108 is decreased. When the molten plastic 122 flows into the cavity 108, it comes into contact with the concave and concave optical surface molding surfaces 123 and 124 simultaneously. As a result, no weld is formed.

With the method of setting the temperature of the mold 101 rather high when casting the molten plastic 122 into the mold 101, the temperature of the mold 101 must be increased or decreased. The molding cycle prolongs to increase the manufacturing cost.

With the method of casting the molten plastic 122 into the cavity 108 while decreasing its flow rate, before charging of the molten plastic 122 into the cavity 108 is completed, the molten plastic 122 which is in contact with the stationary and movable side templates 107 and 109 cools down to increase its viscosity. Then, the transfer performance for the molding surface 123 degrades, and good precision of the optical component cannot be maintained.

The present invention has been made in view of the problems described above. The first object of the present invention is to provide an optical component free from weld formation and having an excellent optical performance. It is the second object of the present invention to provide a mold for an optical component that can manufacture an optical component free from weld formation and having an excellent optical performance.

It is the third object of the present invention to provide an optical component molding method that can manufacture an optical component free from weld formation and having an excellent optical performance.

In order to solve the above problems and achieve the above objects, according to the present invention, there is provided an optical component as a plastic molded product having an optical function, which is formed with a molding surface with a shape of a curved surface, and a flange portion between the molding surface and a gate portion, characterized in that at least part of a surface constituting the flange portion is molded to form an angle substantially equal to a tangential angle to a curvature of the curved surface portion of the molding surface, which is near the flange portion. There is also provided an optical component as a plastic molded product having an optical function, which is formed with a molding surface with a shape of a curved surface, and a flange portion between the molding surface and a gate portion, characterized in that at least part of a surface constituting the gate portion is molded to form an angle substantially equal to a tangential angle to a curvature of the curved surface portion of the molding surface, which is near the gate portion.

There is also provided an optical component as a plastic molded product having an optical function, which is formed with a molding surface with a shape of a curved surface, and a gate portion continuous to the molding surface, characterized in that at least part of a surface constituting the gate portion is molded to form an angle substantially equal to a tangential angle to a curvature of the curved surface portion of the molding surface, which is near the gate portion.

There is also provided an optical component as a plastic molded product having an optical function, which is formed with a molding surface with a shape of a curved surface, and a runner portion continuous to a gate portion of the plastic molded product, characterized in that at least part of a surface constituting the runner portion is molded to form an angle substantially equal to a tangential angle to a curvature of the curved surface portion of the molding surface, which is near the gate portion.

The substantially equal angle is set to have an angular difference of not more than 15°.

The plastic molded product is an optical lens.

The plastic molded product is a meniscus lens.

The plastic molded product is a toric lens.

There is also provided a method of molding a plastic molded product having an optical function, characterized in that, of a mold having a first cavity portion having a molding surface with a shape of a curved surface having the optical function, a second cavity portion for molding a flange portion continuous to the molding surface, and a gate portion continuous to the second cavity portion, a resin injection path constituting the second cavity portion is formed with an angle substantially equal to a tangential angle to a curvature of the curved surface portion of the first cavity portion, which is near the second cavity portion, and a resin material injected through the gate portion is guided along the curved surface.

There is also provided a method of molding a plastic molded product having an optical function, characterized in that, of a mold having a first cavity portion having a molding surface with a shape of a curved surface having the optical function, a second cavity portion for molding a flange portion continuous to the molding surface, and a gate portion continuous to the second cavity portion, a resin injection path constituting the gate portion is formed with an angle substantially equal to a tangential angle to a curvature of the curved surface portion of the first cavity portion, which is near the second cavity portion, and a resin material injected through the gate portion is guided along the curved surface.

There is also provided a method of molding a plastic molded product having an optical function, characterized in that, of a mold having a cavity portion having a molding surface with a shape of a curved surface having the optical function, and a gate portion continuous to the molding portion, a resin injection path constituting the gate portion is formed with an angle substantially equal to a tangential angle to a curvature of the curved surface portion of the cavity portion, which is near the gate portion, and a resin material injected through the gate portion is guided along the curved surface.

There is also provided a method of molding a plastic molded product having an optical function, characterized in that, of a mold at least having a cavity portion having a molding surface with a shape of a curved surface having the optical function, a gate portion, and a runner portion, a resin injection path constituting the runner portion is formed with an angle substantially equal to a tangential angle to a curvature of the curved surface portion of the cavity portion, which is near the gate portion, and a resin material injected through the gate portion is guided along the curved surface.

There is also provided a mold used to mold an optical component as a plastic molded product having an optical function, characterized in that the mold has a first cavity portion having a molding surface with a shape of a curved surface having the optical function, a second cavity portion for molding a flange portion continuous to the molding surface, and a gate portion continuous to the second cavity portion, and that a resin injection path constituting the second cavity portion is formed with an angle substantially equal to a tangential angle to a curvature of the curved surface portion of the first cavity portion, which is near the second cavity portion.

There is also provided a mold used to mold an optical component as a plastic molded product having an optical function, characterized in that the mold has a first cavity portion having a molding surface with a shape of a curved surface having the optical function, a second cavity portion for molding a flange portion continuous to the molding surface, and a gate portion continuous to the second cavity portion, and that a resin injection path constituting the gate portion is formed with an angle substantially equal to a tangential angle to a curvature of the curved surface portion of the first cavity portion, which is near the second cavity portion.

There is also provided a mold used to mold an optical component as a plastic molded product having an optical function, characterized in that the mold has a cavity portion having a molding surface with a shape of a curved surface having the optical function, and a gate portion continuous to the molding surface, and that a resin injection path constituting the gate portion is formed with an angle substantially equal to a tangential angle to a curvature of the curved surface portion of the cavity portion, which is near the gate portion.

There is also provided a mold used to mold an optical component as a plastic molded product having an optical function, characterized in that the mold at least has a cavity portion having a molding surface with a shape of a curved surface having the optical function, and a gate portion and a runner portion, and that a resin injection path constituting the runner portion is formed with an angle substantially equal to a tangential angle to a curvature of the curved surface portion of the cavity portion, which near the gate portion.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 13A and 13B are perspective views of the outer appearance of a meniscus convex lens, in which FIG. 13A shows a meniscus convex lens having a flange, and FIG. 13B shows a meniscus convex lens not having flange;

DETAILED DESCRIPTION OF THE PREFERRED EMBODIMENTS

Preferred embodiments in which an optical component according to the present invention is applied to a meniscus convex lens will be described in detail with reference to FIGS. 1 to 13B. The present invention is not limited to these embodiments, but these embodiments may be further combined, and the present invention can be applied to a technique of other fields including the similar problems.

Figure 13A:
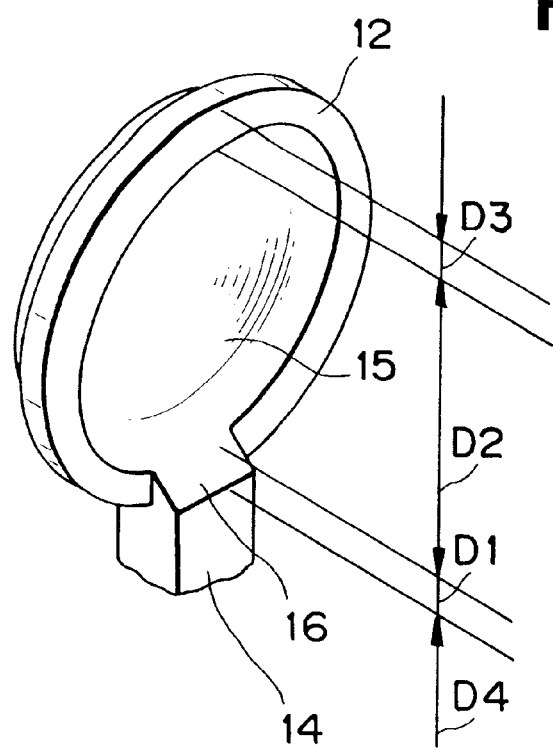

A meniscus convex lens 11 according to the first embodiment has a flange 12 on its peripheral portion, as shown in the perspective view of its outer appearance of FIG. 13A. An end face 16 of the flange 12 extending from a gate molding portion 14 of a molded product 13 of the meniscus convex lens 11 to a concave optical surface 15 of the meniscus convex lens 11 forms a flat surface inclined from the concave optical surface 15 at an angle almost equal to the angle of tangent to the concave optical surface 15.

Figure 2:
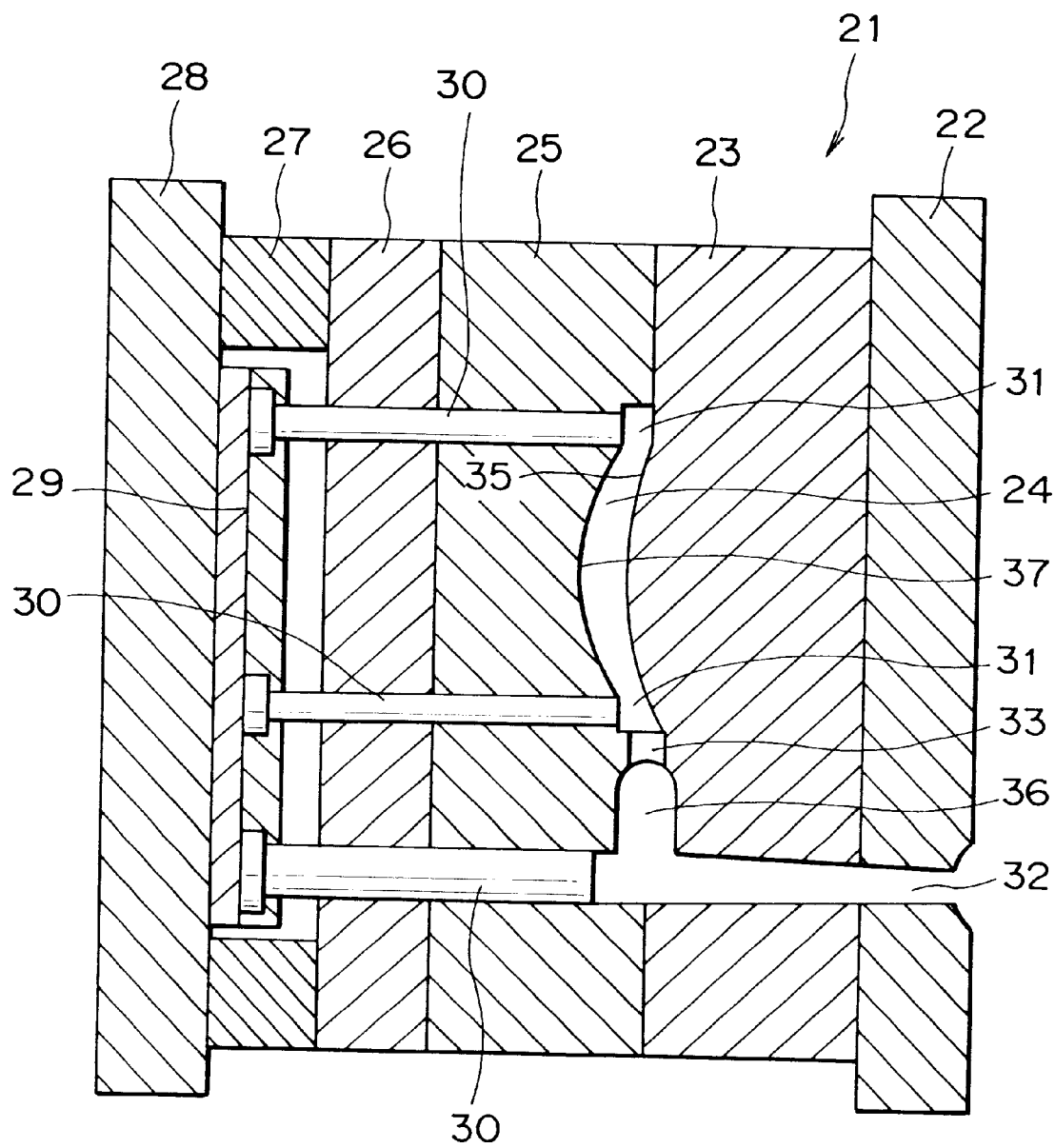
FIG. 2 is a sectional view showing the structure of an example of a mold of the present invention used to mold a molded product according to the first embodiment.

FIG. 2 shows an example of a mold according to the present invention used to mold this meniscus convex lens 11. More specifically, a stationary side template 23 is attached to a stationary side mounting plate 22 of a mold 21 connected to an injection apparatus (not shown). A movable side template 25 for forming a cavity 24 corresponding to the meniscus convex lens 11 together with the stationary side template 23 is fixed to a movable side mounting plate 28 through a pressure spacer 26 and a spacer block 27. An ejector plate 29 is accommodated between the pressure spacer 26 and movable side mounting plate 28 connected to a mold locking apparatus (not shown), and is movable toward the stationary side template 23. Ejector pins 30 extend from the ejector plate 29 to be slidable through the pressure spacer 26 and movable side template 25. The distal end faces of the ejector pins 30 oppose a cavity (this constitutes the peripheral portion of the cavity 24 of the meniscus convex lens 11 and will be referred to as the second cavity hereinafter to distinguish it from the cavity 24 having an optical surface) 31 and a sprue 32.

In this embodiment, a flange molding surface 34 of the second cavity 31 located between a gate 33 corresponding to the gate molding portion 14 and the cavity 24, i.e., the surface that molds the end face 16 of the flange 12 of the molded product 13, forms a flat surface inclined from a concave optical surface molding surface 35 of the cavity 24 at an angle nearly equal to the tangential angle to the concave optical surface molding surface 35 of the cavity 24.

Figure 1:
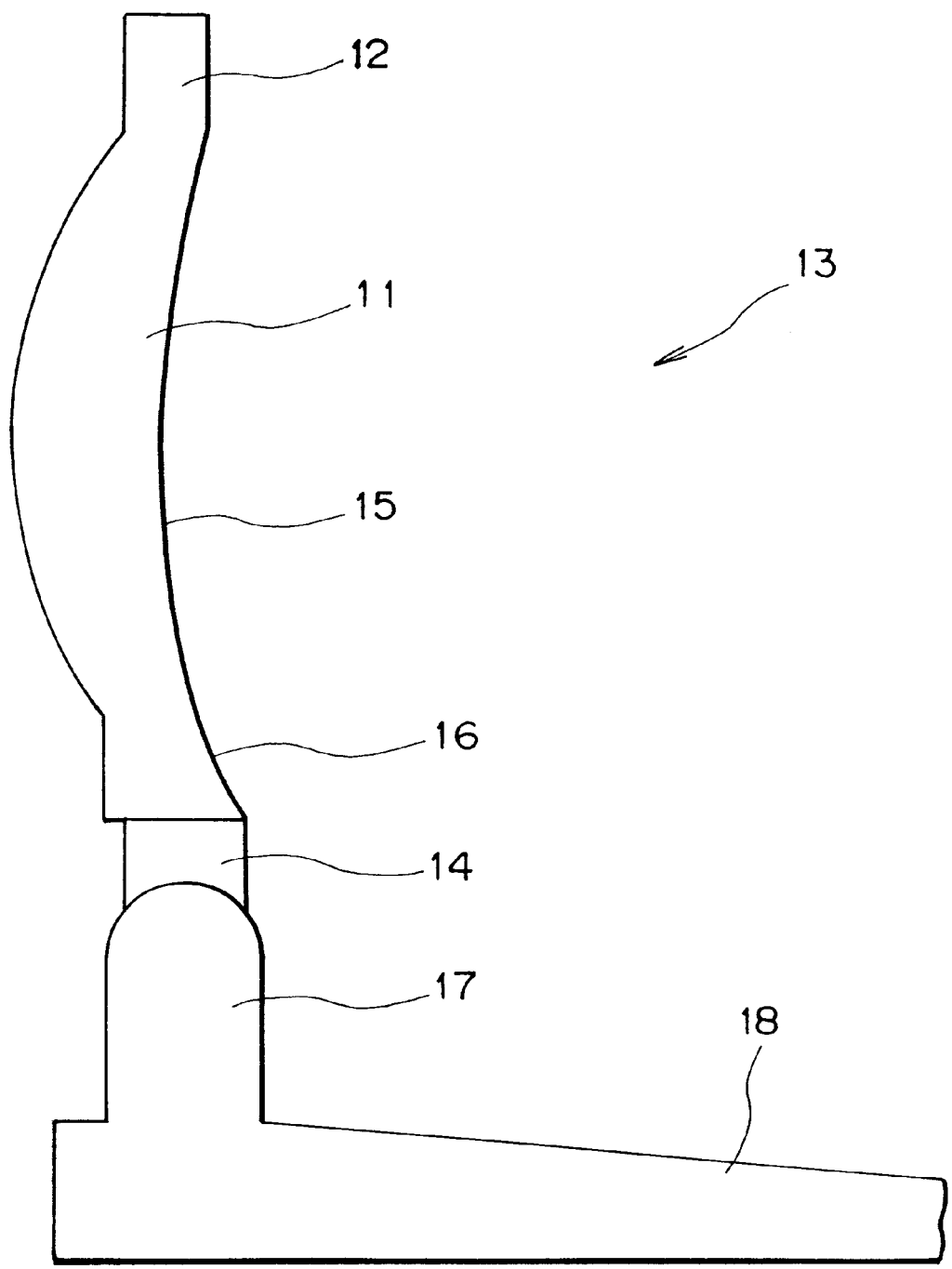
FIG. 1 is a sectional view showing the shape of a molded product of the first embodiment in which an optical component according to the present invention is applied to a meniscus convex lens.

The mold 21 is adjusted to a predetermined temperature. Molten plastic is supplied from the injection apparatus to the mold 21 through the sprue 32 formed in the stationary side mounting plate 22 and template 23, and flows through a runner 36 and the gate 33 to fill the cavity 24 through the second sprue 31. After that, the plastic in the cavity 24 is cooled, the movable side template 25 is separated from the stationary side template 23, and the ejector plate 29 is moved forward toward the stationary side template 23, so that the molded product 13 shown in FIG. 1 is ejected from the movable side template 25 through the ejector pins 30.

In addition to the gate molding portion 14 described above, the meniscus convex lens 11 having the flange 12 of the molded product 13 is integrally formed with a runner molding portion 17 and a sprue molding portion 18 continuous to the gate molding portion 14. When the molded product 13 is cut at its gate molding portion 14, the meniscus convex lens 11 having the flange 12 can be obtained.

Figure 3:
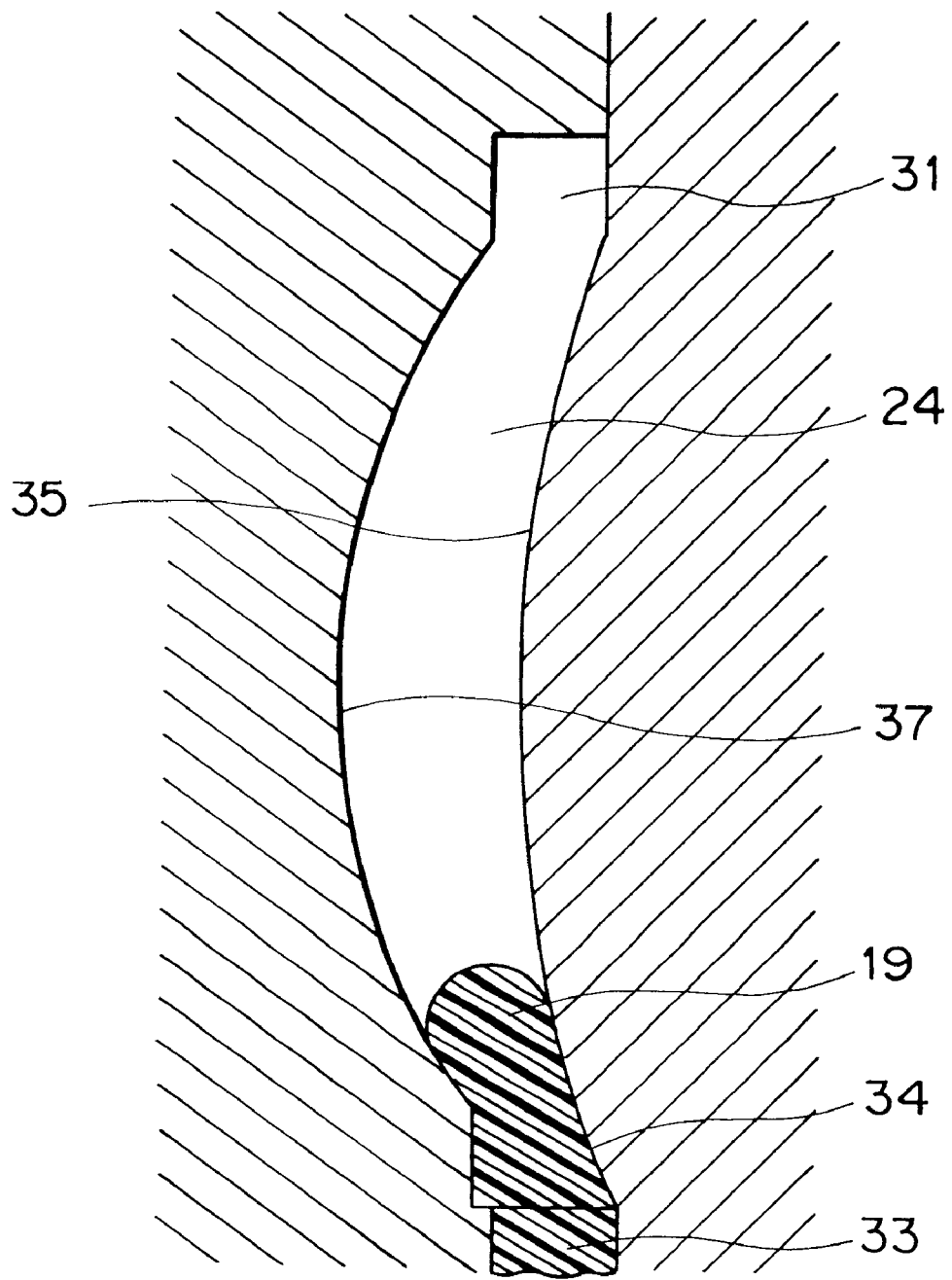
FIG. 3 is a sectional view showing the initial casting state of the flowing process of a resin in the cavity of the mold shown in FIG. 2.
Figure 4:
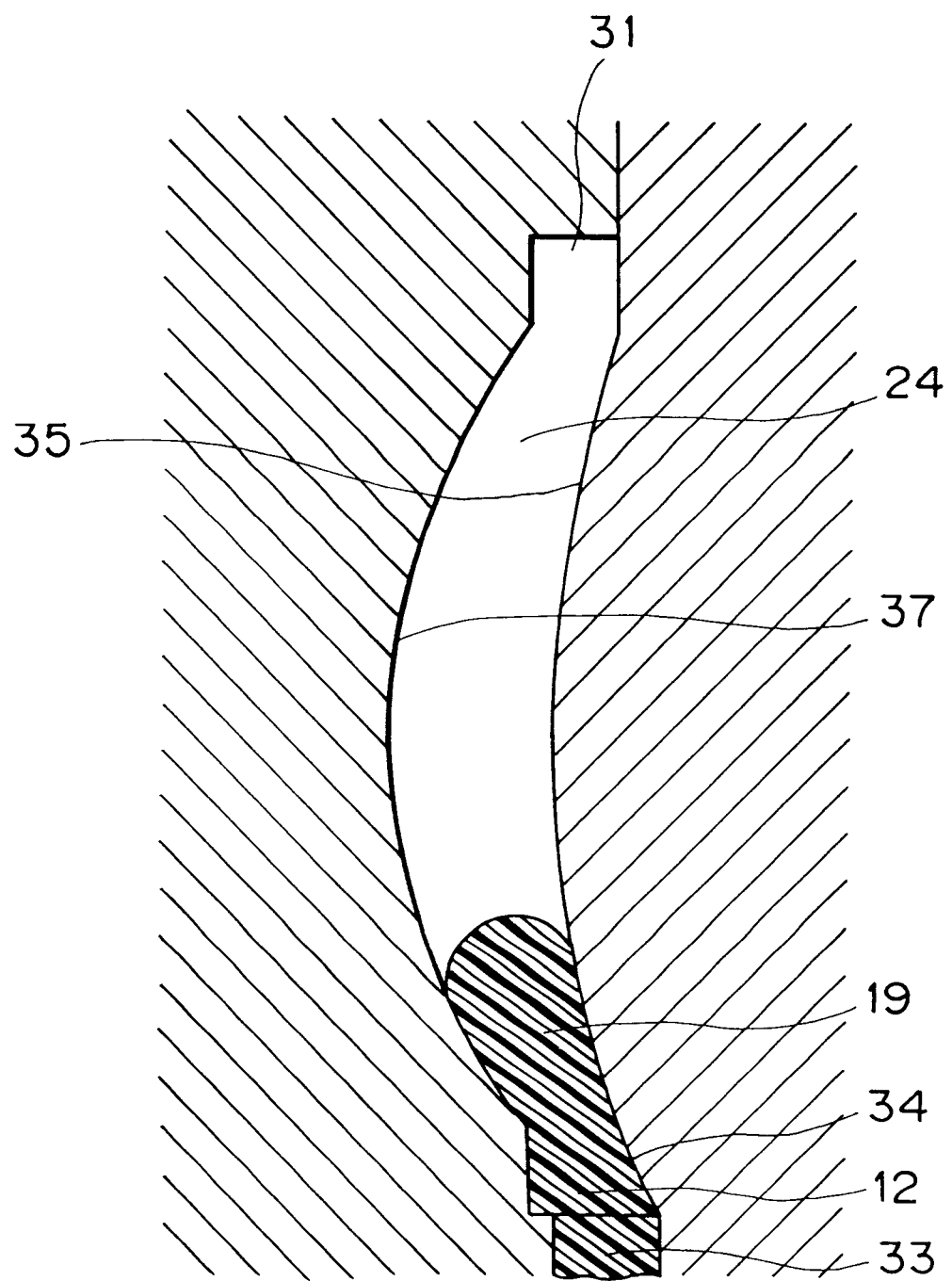
FIG. 4 is an illustration indicating the flowing process of the resin in the mold shown in FIG. 2, and is a sectional view showing a state later than the case of FIG. 3.

FIGS. 3 and 4 show how molten plastic 19 flows from the gate 33 to the cavity 24 through the second cavity 31 when this mold 21 is used. The molten plastic 19 is cast from the second cavity 31 into the cavity 24 through the sprue 32, runner 36, and gate 33. Since the flange molding surface 34 of the second cavity 31 upstream the cavity 24 is located almost on an extension of the concave optical surface molding surface 35 of the cavity 24, the molten plastic 19 that has passed through the gate 33 flows along the flange molding surface 34 of the second cavity 31. More specifically, when the molten plastic 19 passes through the runner 36 and gate 33, it flows with an upward vector in FIG. 2. The molten plastic 19 is then influenced by the flange molding surface 34 in the second cavity 31 to have a leftwardly upward vector in FIG. 2. Hence, as shown in FIG. 3, the molten plastic 19 flows to come into contact with both the concave optical surface molding surface 35 and a convex optical surface molding surface 37 from the beginning as it flows into the cavity 24, and fills even the distal end of the second cavity 31 opposite to the gate 33 without forming a weld, as shown in FIG. 4.

In the above embodiment, the end face 16 of the flange 12 extending from the gate molding portion 14 of the molded product 13 to the concave optical surface 15 of the meniscus convex lens 11 is located substantially along the concave optical surface 15. Alternatively, the end face of the flange of the molded product 13, that extends from the gate molding portion 14 to the convex optical surface of the meniscus convex lens 11, may also extend substantially along the convex optical surface.

Figure 5:
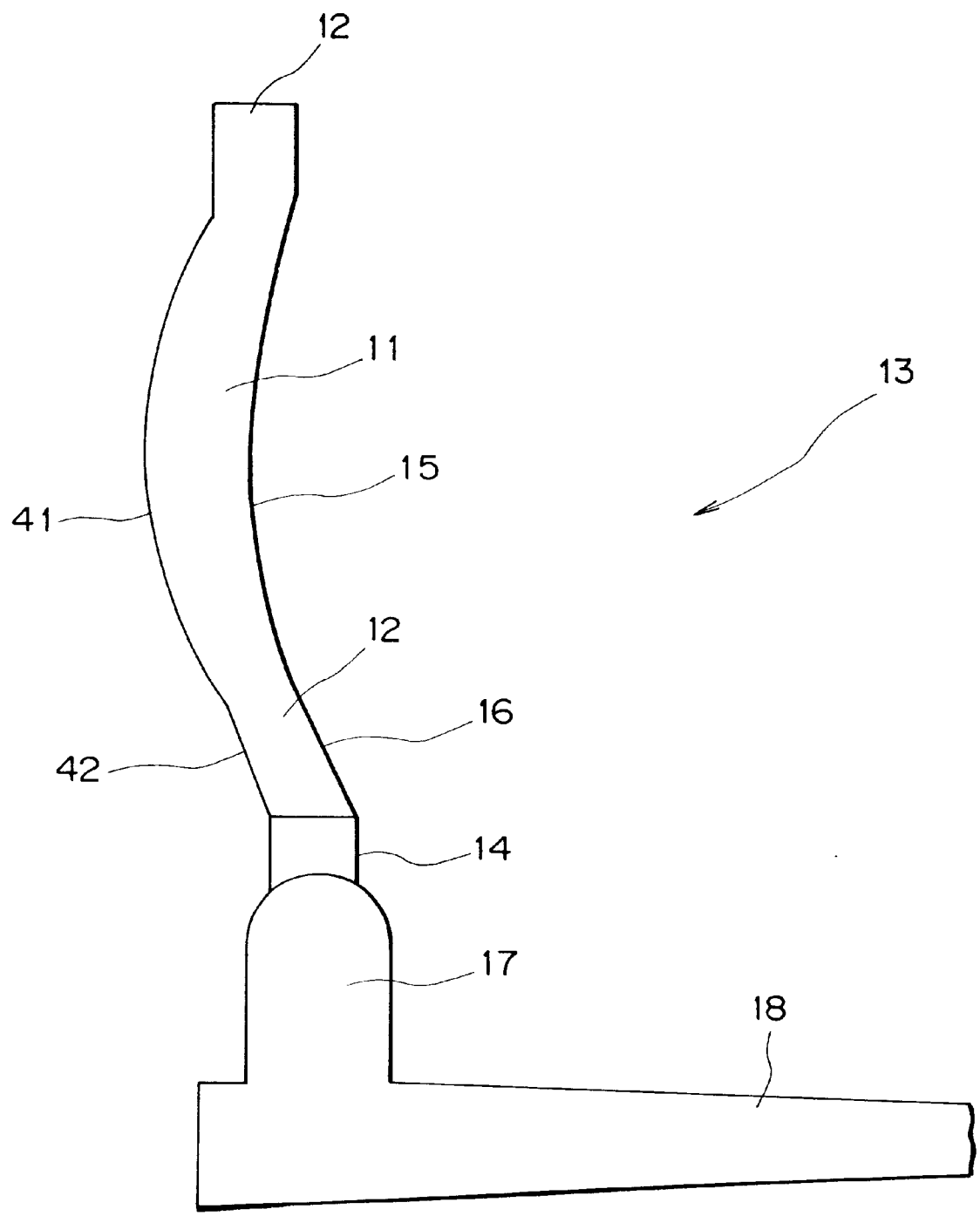
FIG. 5 is a sectional view showing the shape of a molded product of the second embodiment in which an optical component according to the present invention is applied to a meniscus convex lens.

FIG. 5 shows the sectional structure of a molded product as an optical component according to the second embodiment of the present invention. Note that members having the same functions as in the first embodiment described above are merely denoted by the same reference numerals, and a repetitive explanation thereof will be omitted. A meniscus convex lens 11 according to the second embodiment also has a flange 12 on its peripheral portion. Two end faces 16 and 42 of the flange 12 of this molded product 12, which extend from a gate molding portion 14 to concave and convex optical surfaces 15 and 41, respectively, of the meniscus convex lens 11, form flat surfaces inclined at angles nearly equal to the angles of tangents to the concave and convex optical surfaces 15 and 41, respectively. When the flange 12 close to the gate molding portion 14 is inclined in this manner in accordance with the arcuated shape of the periphery of the meniscus convex lens 11, formation of a weld at that portion of the convex optical surface 41, which is close to the gate molding portion 14 can be prevented more reliably.

The two embodiments described above exemplify the meniscus convex lens 11 having the flange 12. The present invention can also be applied to a meniscus convex lens 11 having no flange 12.

Figure 6:
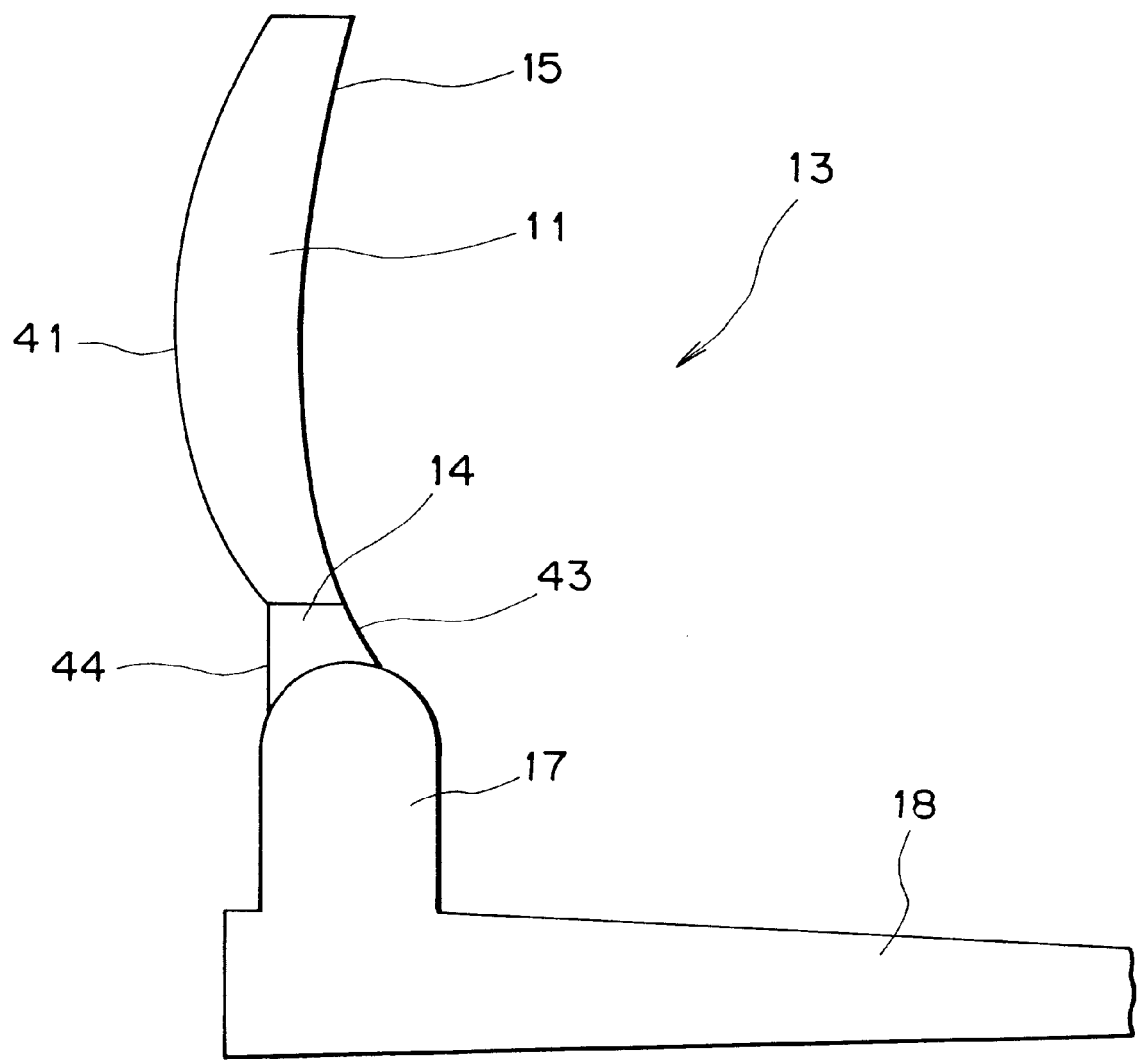
FIG. 6 is a sectional view showing the shape of a molded product of the third embodiment in which an optical component according to the present invention is applied to a meniscus convex lens.

FIG. 6 shows the sectional structure of a molded product as an optical component according to the third embodiment of the present invention. Note that members having the same functions as in the embodiments described above are merely denoted by the same reference numerals, and a repetitive explanation thereof will be omitted. More specifically, a wall surface 43 of a gate molding portion 14 continuous to a concave optical surface 15 of a meniscus convex lens 11 according to the third embodiment forms a flat surface inclined from the concave optical surface 15 of the meniscus convex lens 11 at an angle almost equal to the angle of tangent to the concave optical surface 15 of the meniscus convex lens 11. The wall surface 43 of the gate molding portion 14 corresponds to the end face 16 of the flange 12 of the first or second embodiment. In the third embodiment, only the wall surface 43 of the gate molding portion 14 continuous to the concave optical surface 15 is formed to extend substantially along the concave optical surface 15. Alternatively, a wall surface 44 of the gate molding portion 14 continuous to a convex optical surface 41 may also be formed to extend substantially along the convex optical surface 41.

In the meniscus convex lens 11 having the flange 12 like that of the first or second embodiment, when the wall surface of the gate molding portion 14 continuous to the end face of the flange 12 is also inclined as in the third embodiment, molding free from weld formation can be performed more reliably.

Figure 7:
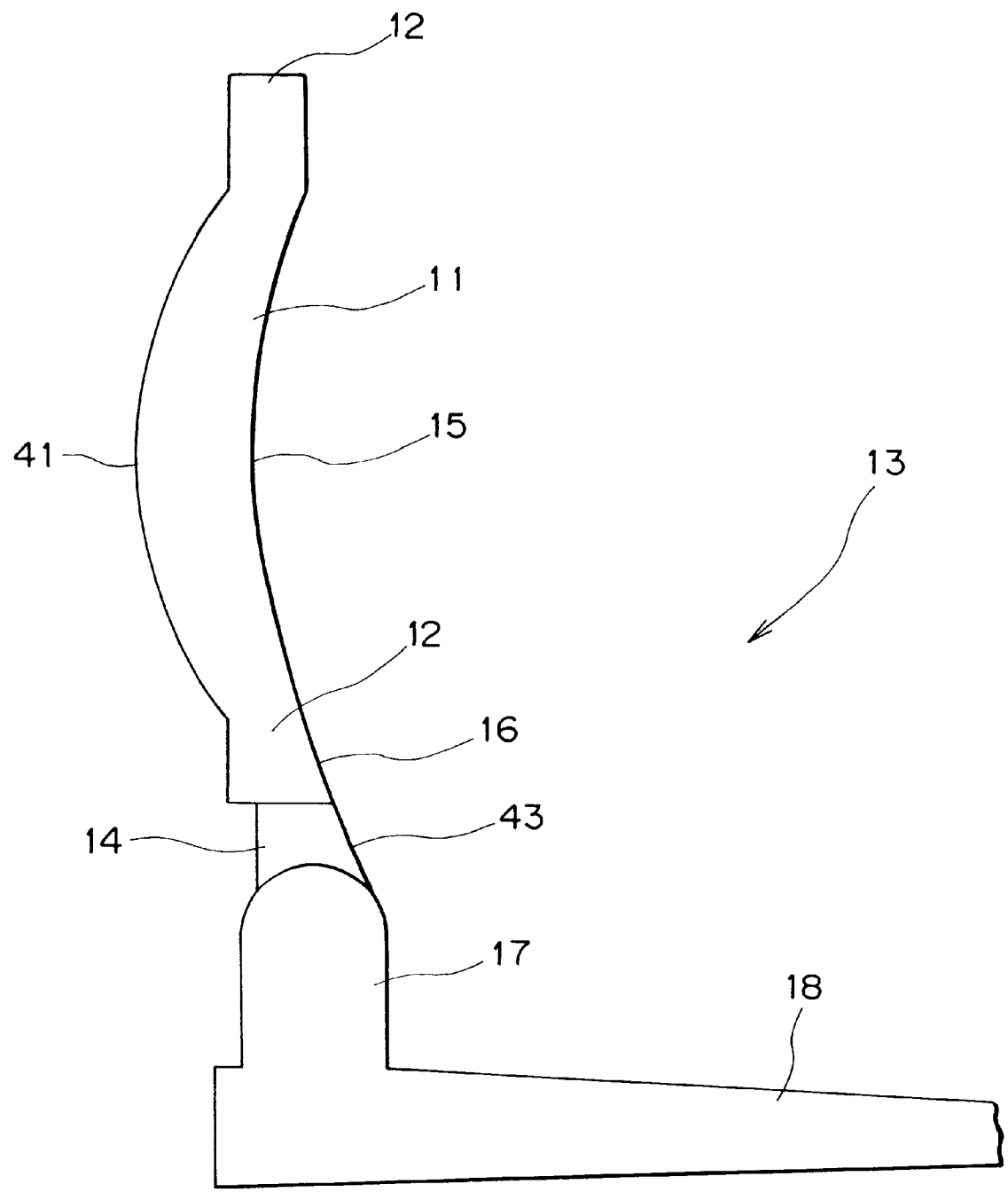
FIG. 7 is a sectional view showing the shape of a molded product of the fourth embodiment in which an optical component according to the present invention is applied to a meniscus convex lens.

FIG. 7 shows the sectional structure of a molded product as an optical component according to the fourth embodiment of the present invention. Note that members having the same functions as in the embodiments described above are merely denoted by the same reference numerals, and a repetitive explanation thereof will be omitted. More specifically, a meniscus convex lens 11 according to the fourth embodiment is a further improvement over that of the first embodiment. A wall surface 43 of a gate molding portion 14 of a molded product 13, which extends from a runner molding portion 17 to an end face 16 of a flange 12, extends along the end face 16 of the flange 12 and is inclined so as to be located almost on an extension of the end face 16 of the flange 12.

In the above embodiment, the wall surface 43 of the gate molding portion 14 of the molded product 13, which extends from the runner molding portion 17 to the end face 16 of the flange 12, is formed to extend substantially along the end face 16 of the flange 12. The end face of a convex optical surface 14 side may also be formed in the same manner.

Figure 8:
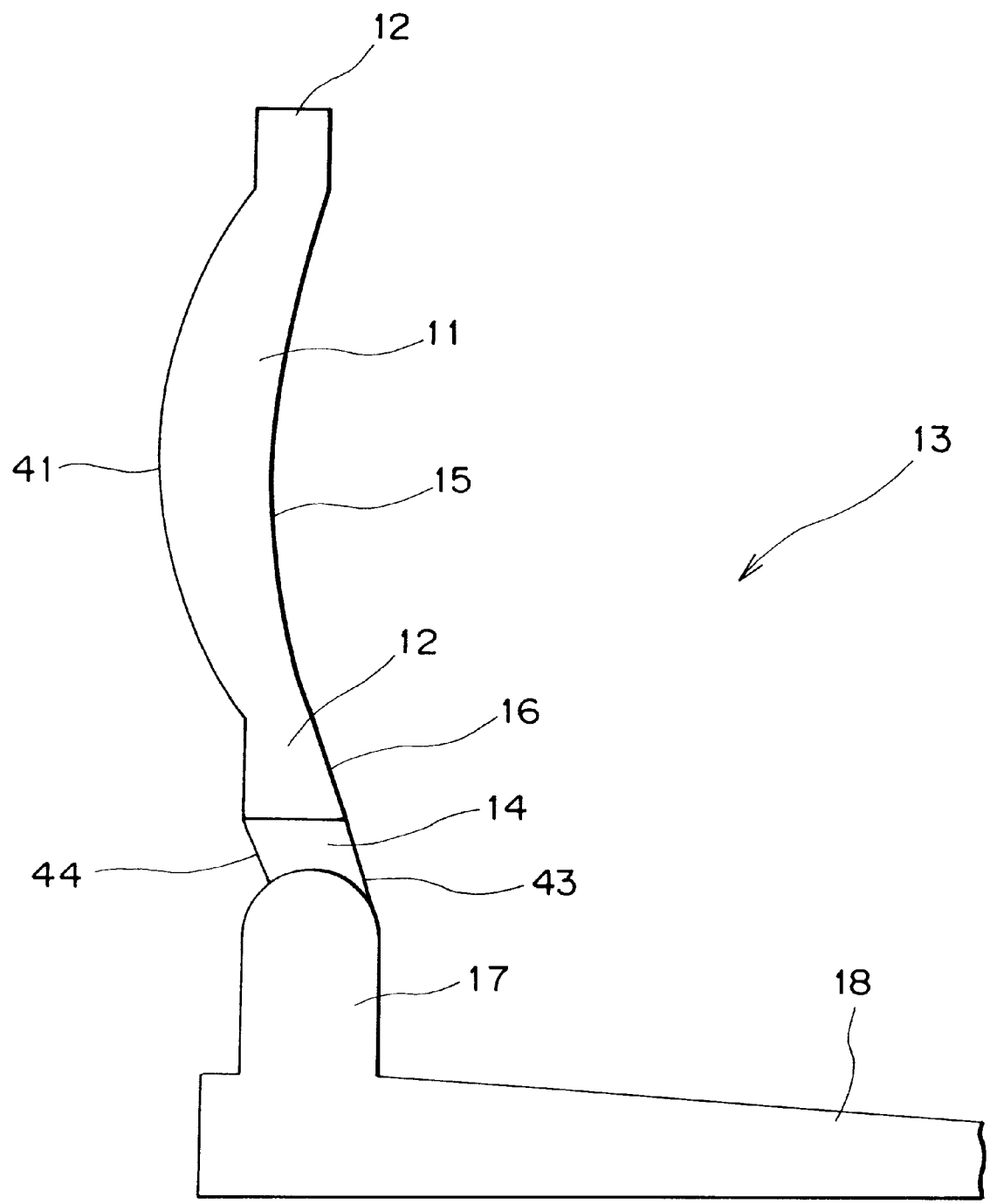
FIG. 8 is a sectional view showing the shape of a molded product of the fifth embodiment in which an optical component according to the present invention is applied to a meniscus convex lens.

FIG. 8 shows the sectional structure of a molded product as an optical component according to the fifth embodiment of the present invention. Note that members having the same functions as in the embodiments described above are merely denoted by the same reference numerals, and a repetitive explanation thereof will be omitted. More specifically, a wall surface 44 located opposite to a wall surface 43 of a gate molding portion 14 extending along an end face 16 of a flange 12 is formed to be almost parallel to the wall surface 43 of the gate molding portion 14. Hence, the molten plastic (not shown) passing through the wall surface 44 is set to flow along the arcuated shape of a meniscus convex lens 11, thereby preventing formation of a weld.

Figure 9:
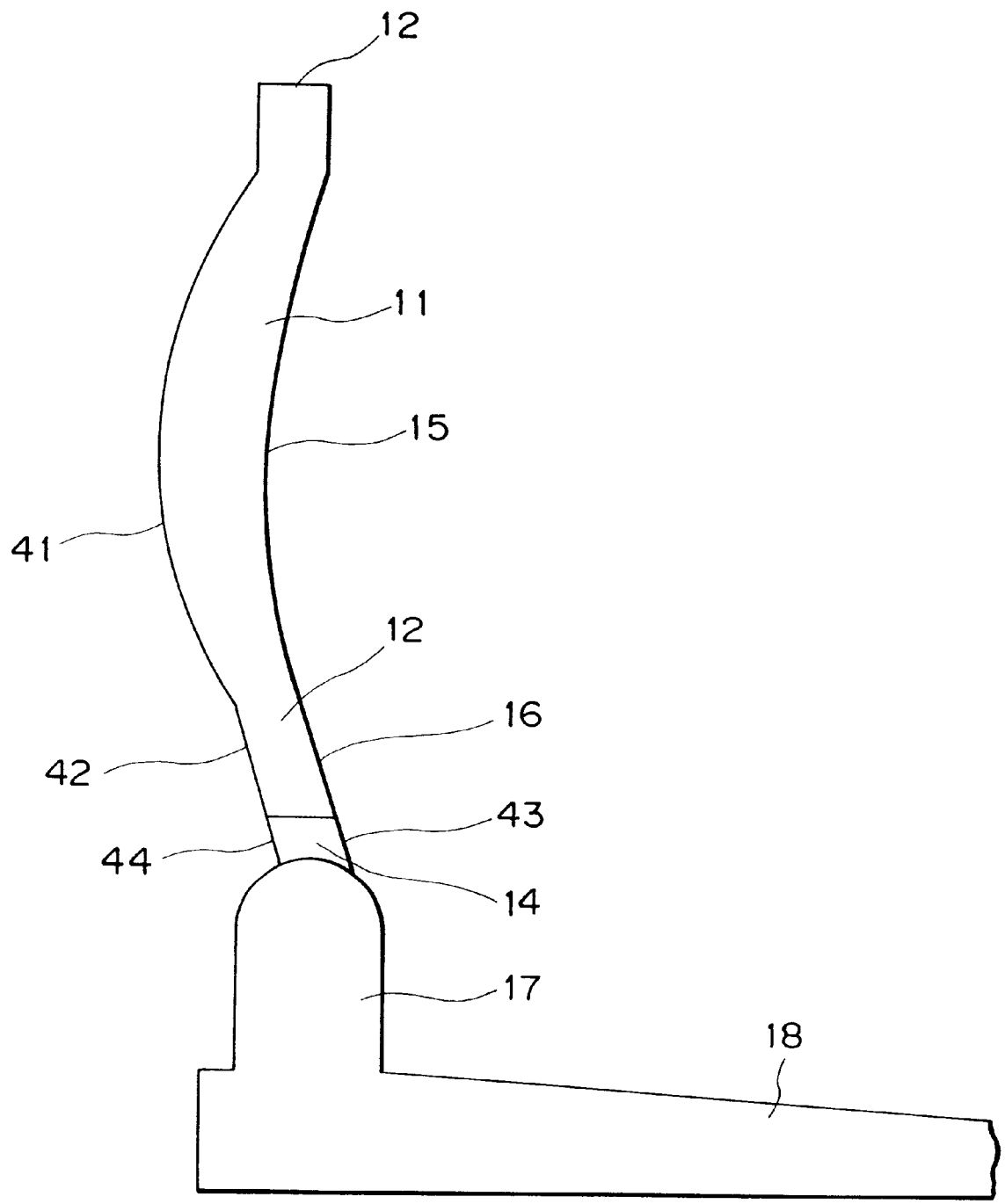
FIG. 9 is a sectional view showing the shape of a molded product of the sixth embodiment in which an optical component according to the present invention is applied to a meniscus convex lens.

A molded product 13 as an optical component according to the sixth embodiment of the present invention shown in FIG. 9 is a combination of the second and fifth embodiments described above. An end face 16 of a flange 12 and a wall surface 43 of a gate molding portion 14 are formed to extend substantially along a concave optical surface 15 of a meniscus convex lens 11. An end face 42 of the flange 12 and a wall surface 44 of the gate molding portion 14 are formed to extend substantially along a convex optical surface 41 of the meniscus convex lens 11. Hence, the molten plastic flowing from the runner of a mold (not shown) into the second cavity through the gate can be set to flow along the arcuated shape of the cavity corresponding to the meniscus convex lens 11, thereby preventing formation of a weld more reliably.

Formation of a weld can also be prevented by changing the shape of the runner molding portion 17 of the first embodiment described above.

Figure 10:
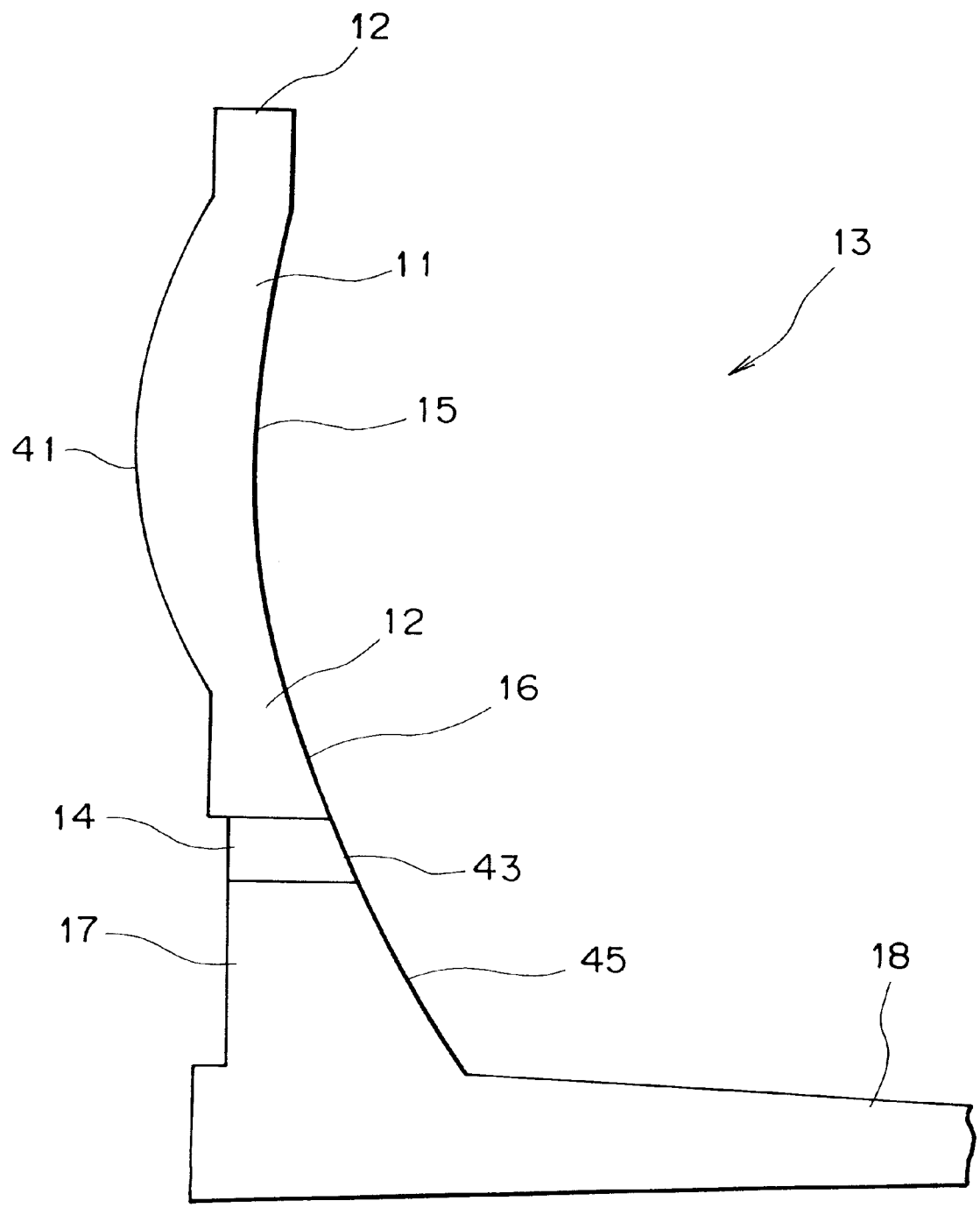
FIG. 10 is a sectional view showing the shape of a molded product of the seventh embodiment in which an optical component according to the present invention is applied to a meniscus convex lens.

FIG. 10 shows the sectional structure of a molded product as an optical component according to the seventh embodiment of the present invention. Note that members having the same functions as in the embodiments described above are merely denoted by the same reference numerals, and a repetitive explanation thereof will be omitted. More specifically, a wall surface 45 of a runner molding portion 17 continuous to a concave optical surface 15 of a meniscus convex lens 11 according to the seventh embodiment extends substantially parallel to an inclined end face 16 of a flange 12 through a gate molding portion 14. Even if the gate molding portion 14 is a conventional one, because of the end face 16 of the flange 12 described above as well, formation of a weld at that portion of a convex optical surface 41, which is close to the flange 12 can be prevented.

In the structure of this embodiment, the gate molding portion 14 has the same shape as that of a conventional one, and accordingly this embodiment is effective when the gate molding portion 14 is particularly short. If the gate molding portion 14 is comparatively long, a good result can be obtained by forming a wall surface 43 of the gate molding portion 14 to extend substantially along the concave optical surface 15 of the meniscus convex lens 11, as well as the end face 16 of the flange 12, as in the embodiment shown in FIG. 8. More specifically, even if the optical component has a particularly short gate molding portion 14 or it does not have a connecting portion such as a flange 12 due to a specific shape of the optical surface of the molded product, formation of a weld can be prevented by forming only the wall surface of the runner molding portion 17 to be substantially parallel to the optical surface of the optical component continuous to it.

The embodiments described above exemplify the meniscus convex lens 11 made of a plastic. The present invention can be applied to optical components as a whole such as a mirror and a prism having an optical surface, and can also be applied to molding of glass or a metal.

Figure 11:
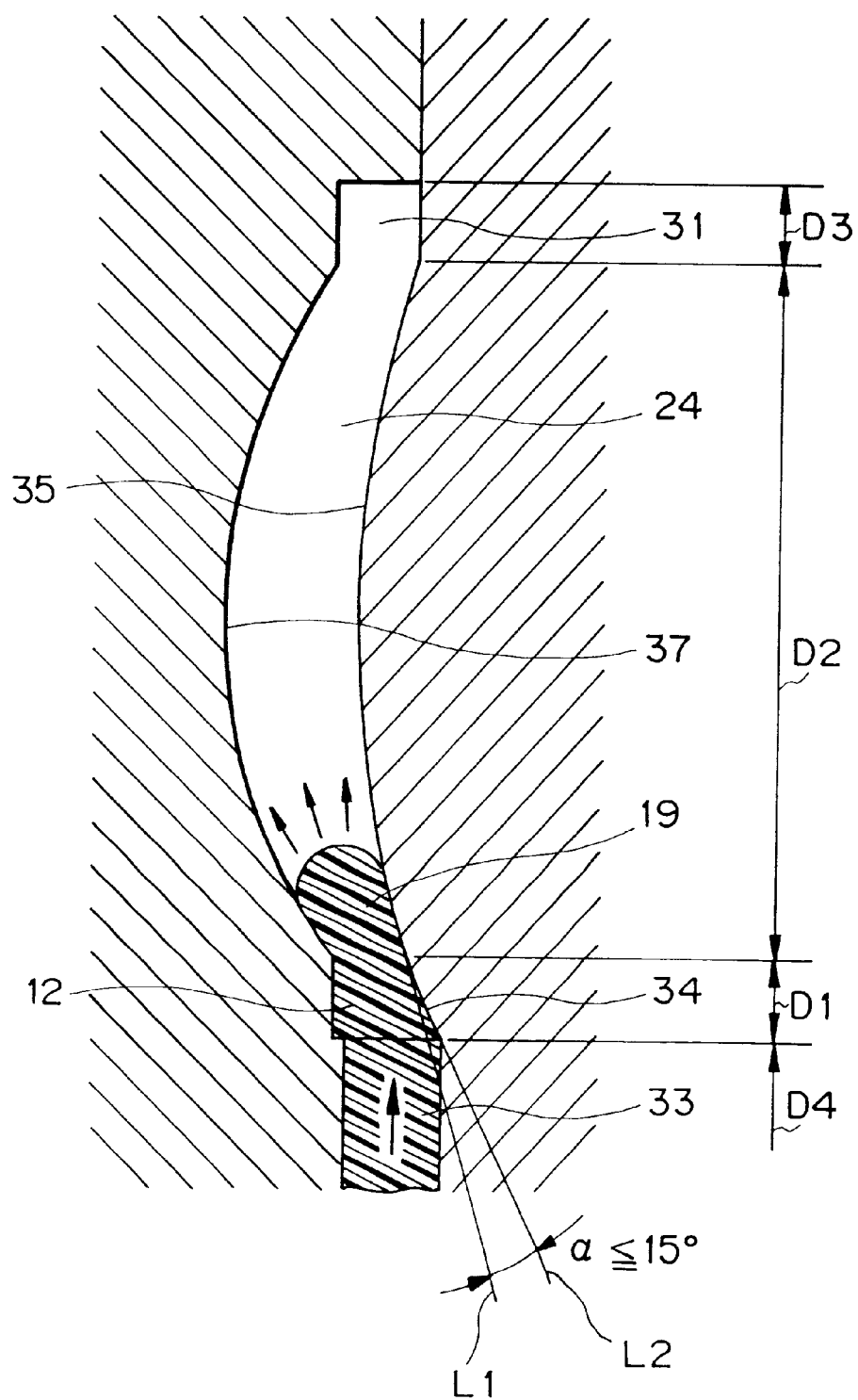
FIG. 11 is a sectional view showing the initial casting state of the flowing process of the resin in FIG. 2.

FIG. 11 is a sectional view of the cavity of the mold 21 shown in FIG. 2. The building components that have already been described are denoted by the same reference numerals to omit repetitive explanation. Flange portions respectively having sizes D1 and D3 are continuously formed to extend from the concave optical surface molding surface 35 having a size D2. A line segment L1 extending from a tangent to the curvature of the concave optical surface molding surface 35 makes an angle α of 15° or less with a line segment L2 extending from the flange portion. Therefore, the molten plastic 19 flows to the cavity 24 through the gate 33 along the concave optical surface molding surface 35 with an upward vector in FIG. 11, so formation of a weld can be prevented.

Figure 12:
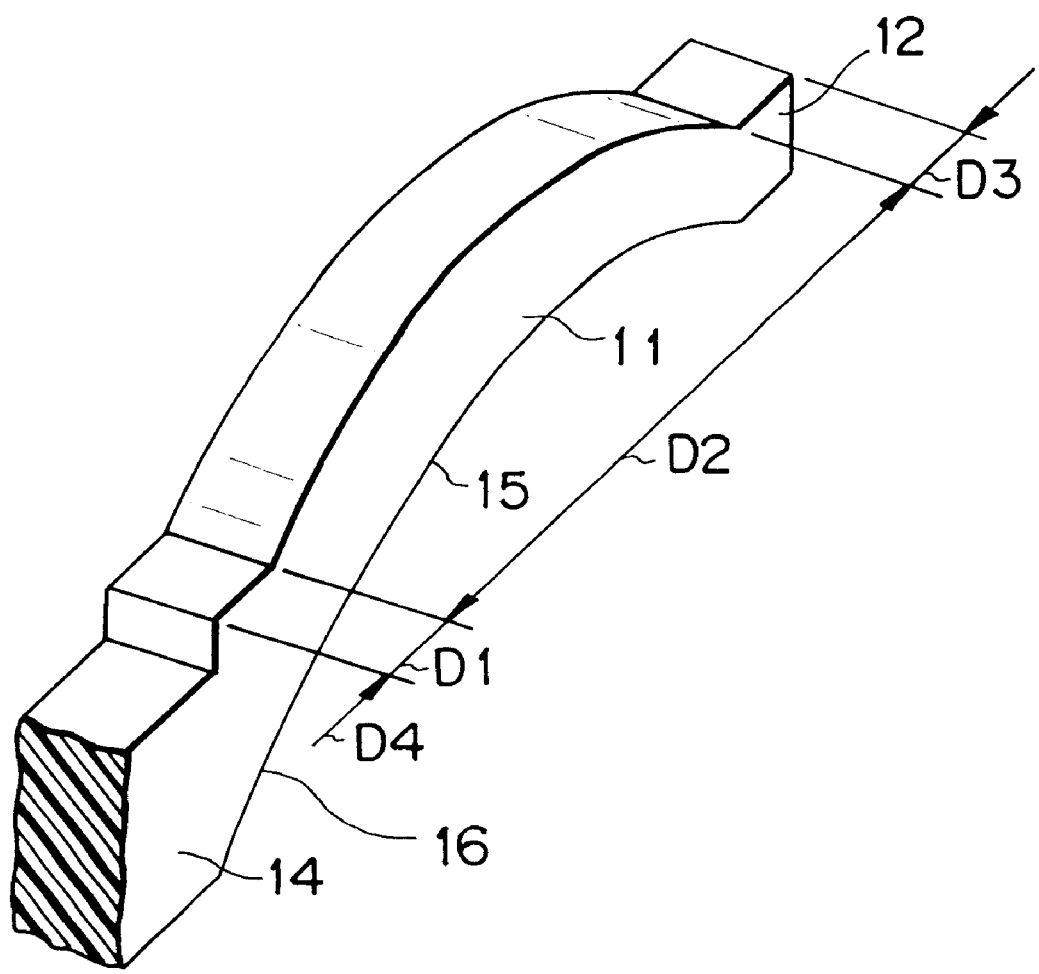
FIG. 12 is a perspective view of the outer appearance of a toric lens.

FIG. 12 is a perspective view of the outer appearance of a toric lens used in a laser beam printer apparatus or the like. As shown in FIG. 12, flange portions 12 and 16 respectively having sizes D1 and D3 are continuously formed to extend from a concave optical surface molding surface 15 having a size D2. A line segment L1 extending from a tangent to the curvature of the concave optical surface molding surface 15 makes an angle α of 15° or less with a line segment L2 extending from the flange portion, as described with reference to FIG. 11. As a result, formation of a weld can be effectively prevented.

FIG. 13A is a perspective view of the outer appearance of a meniscus convex lens. As shown in FIG. 13A, flange portions 12 and 16 respectively having sizes D1 and D3 are continuously formed to extend from a concave optical surface molding surface 15 having a size D2. The flange wall portion 16 is formed in part of the flange portion 12, so that a line segment L1 extending from a tangent to the curvature of the concave optical surface molding surface 15 makes an angle α of 15° or less with a line segment L2 extending from the flange portion, as described with reference to FIG. 11. As a result, formation of a weld can be effectively prevented.

Figure 13B:
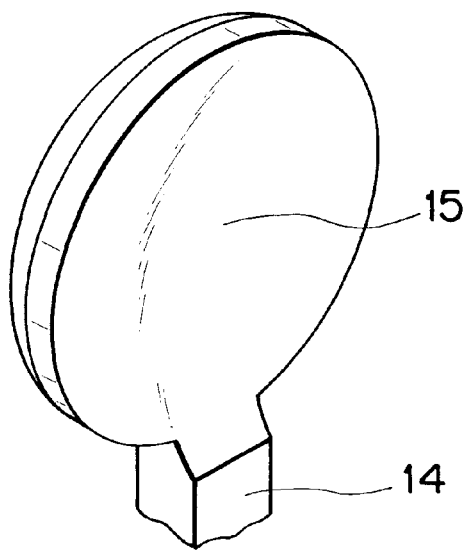
Figure 14:
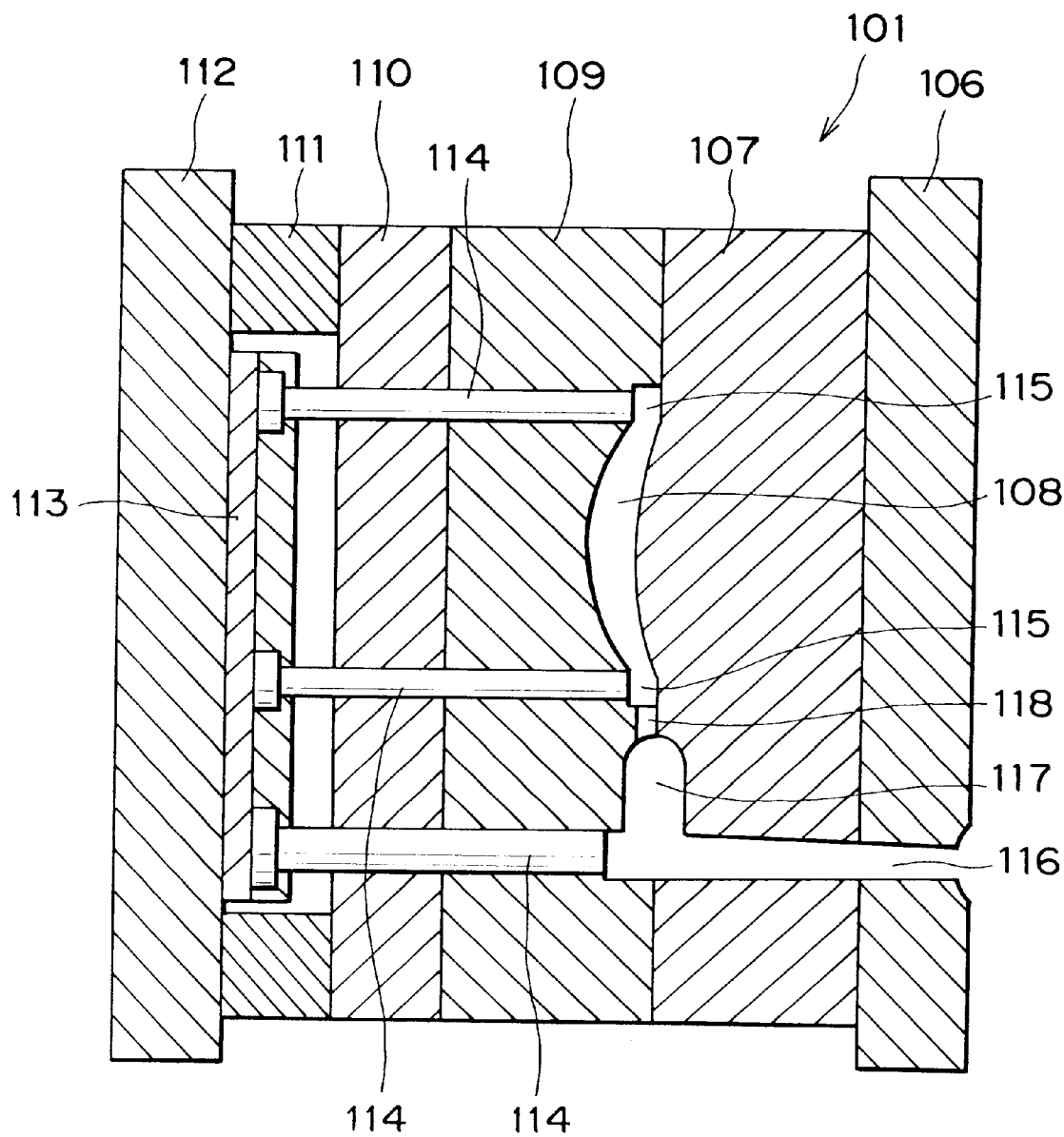
FIG. 14 is a sectional view showing the structure of an example of a conventional mold used to mold a meniscus convex lens.
Figure 15:
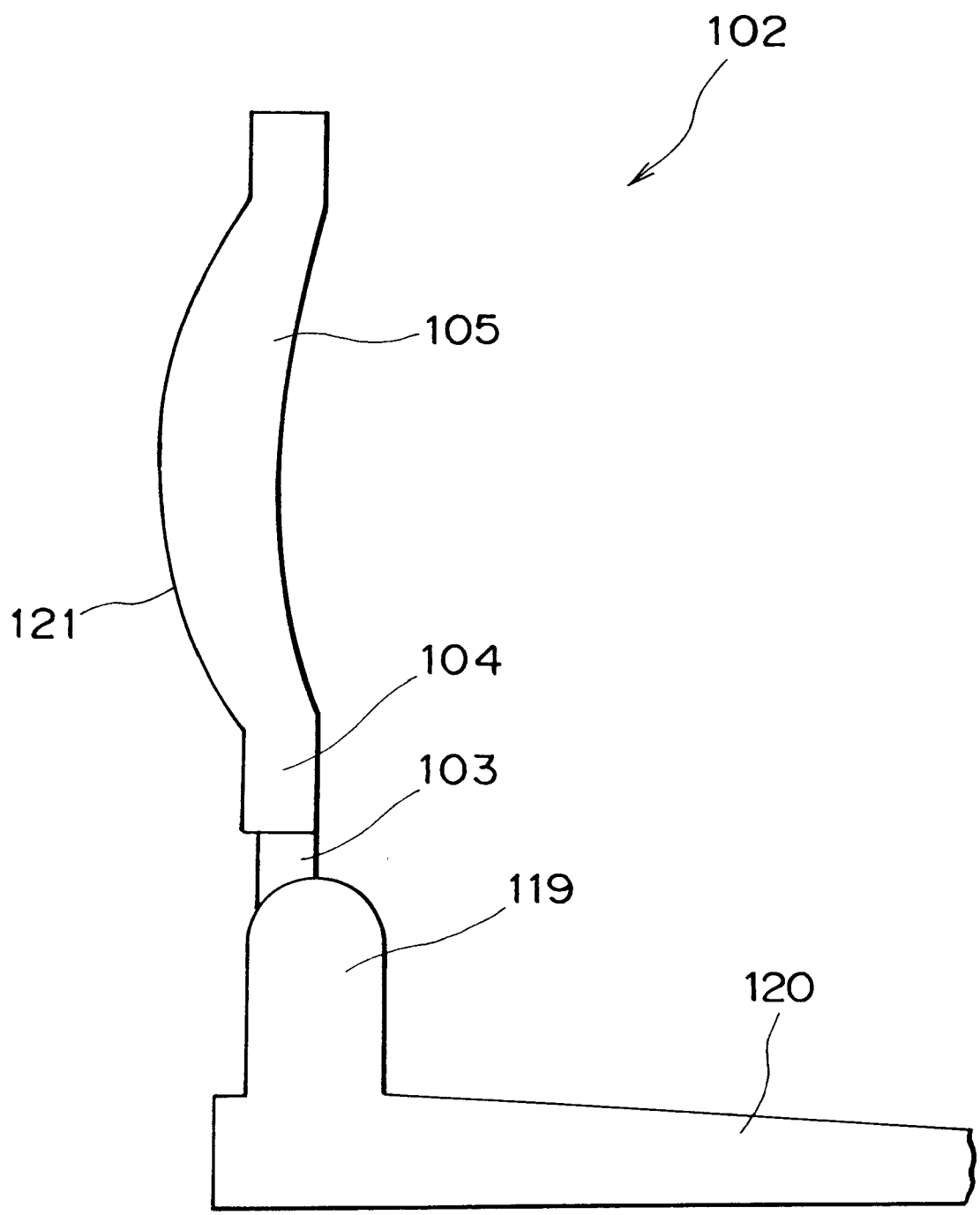
FIG. 15 is a sectional view showing the shape of a conventional molded product molded by the mold shown in FIG. 14.
Figure 16:
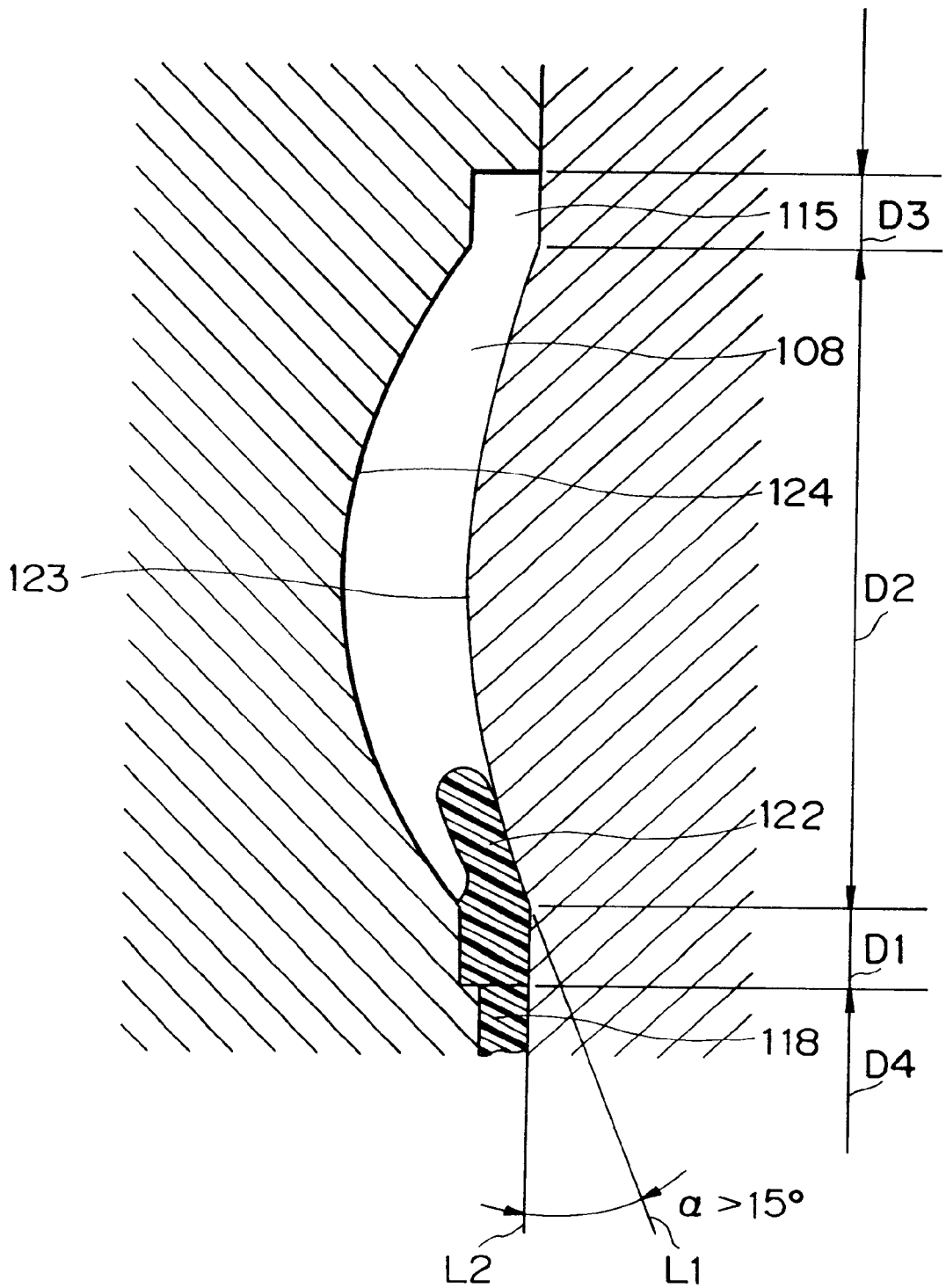
FIG. 16 is an illustration indicating the flowing process of the resin in the cavity of the mold shown in FIG. 14, and is a sectional view showing the initial casting state.
Figure 17:
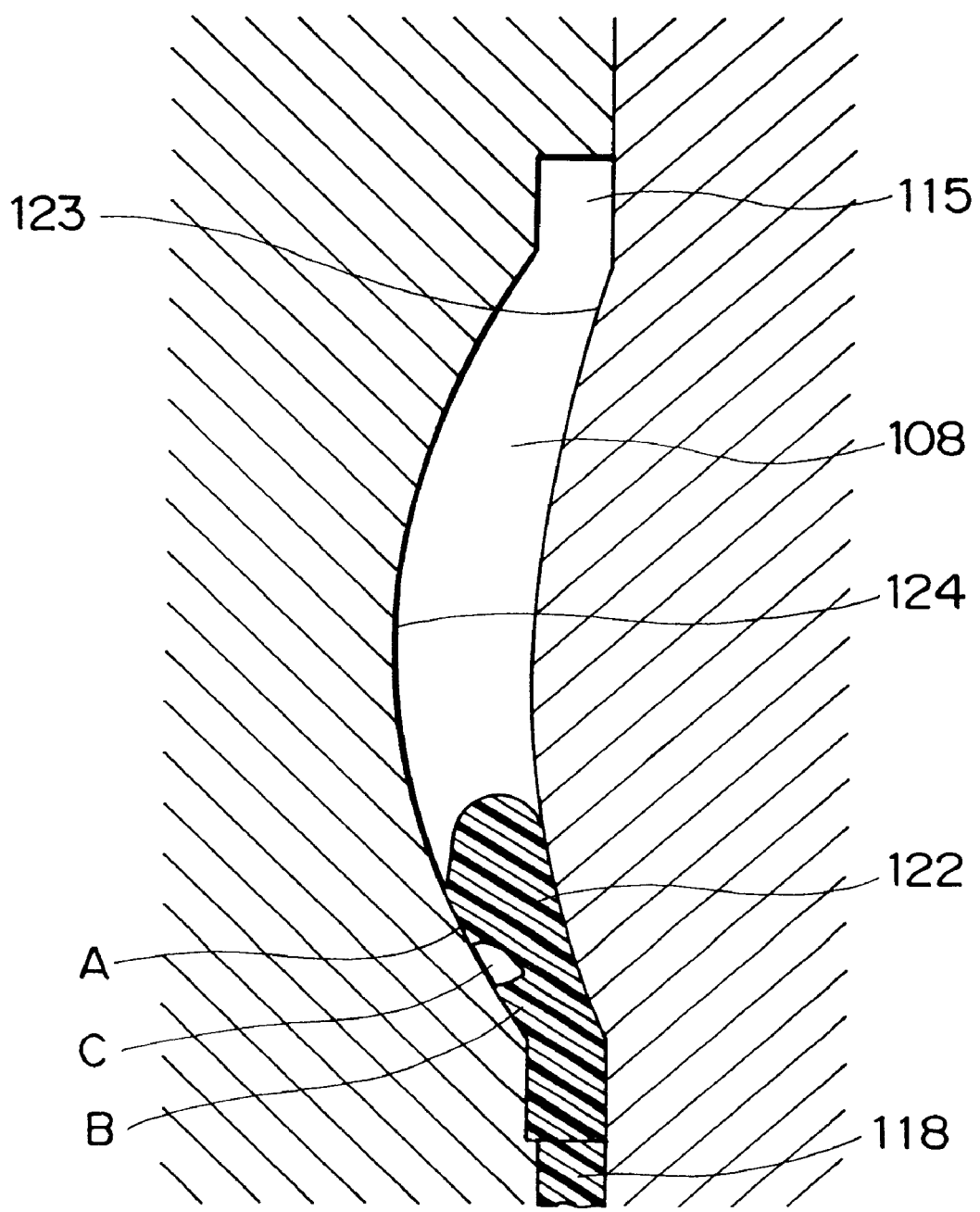
FIG. 17 is an illustration indicating the flowing process of the resin in the mold shown in FIG. 14, and shows a state later than the state shown in FIG. 16.

FIG. 13B is a perspective view of the outer appearance of another meniscus convex lens. As shown in FIG. 13B, no flange portion is formed, but a gate portion is molded, so that between a line segment L1 extending from a tangent to the curvature of a concave optical surface molding surface 15 makes an angle α of 15° or less with a line segment L2 extending from the flange portion, as described with reference to FIG. 11.

As the molten resin material described above, among olefin- or norbornane-based optical component resin materials, a resin material marketed as Zeonex (Tradename) available from Nippon Zeon, Apel (Tradename) available from Mitsui Chemicals, or Arton (Tradename) available from JSR Corp. can be used. Regarding the molding condition, when the temperature of the injection resin was set to 280° C. and the temperature of the mold and molten resin was set to 120° C., a good result was obtained.

According to the present invention, the wall surface of the gate molding portion is formed to extend substantially along the optical surface of an optical portion close to the gate molding portion. An optical component free from a weld and having an excellent optical performance can thus be obtained.

Similarly, the wall surface of the connecting portion continuous to the gate molding portion is formed to extend along the optical surface close to this connecting portion. A good optical component free from a weld and having an excellent optical performance can thus be obtained.

The wall surface of the gate is formed to extend along the optical surface molding surface of the cavity close to the gate of the mold. A mold capable of manufacturing an optical component free from a weld and having an excellent optical performance can thus be provided.

Likewise, the wall surface of the second cavity corresponding to the connecting portion located between the gate of the mold and the first cavity corresponding to the optical portion is formed to extend along the optical surface molding surface close to the second cavity. A mold capable of manufacturing an optical component free from a weld and having an excellent optical performance can thus be provided.

The flow of the molding material from the gate molding portion to the optical portion is directed along the optical surface close to the gate molding portion. An optical component free from a weld and having an excellent optical performance can thus be provided.

Also, the flow of the molding material from the gate molding portion to the optical portion through the connecting portion is directed along the optical surface close to the connecting portion located between the gate molding portion and the optical portion. An optical component free from a weld and having an excellent optical performance can thus be manufactured.

Even when the molding operation is performed while maintaining the mold temperature at a constant value, no weld is formed in the optical component. When injecting molten plastic, the mold temperature need not be increased and then decreased to cool the molded product. The molding cycle is shortened to decrease the production cost.

In addition, even when the molding operation is performed without decreasing the injection speed while injecting a molten plastic, no weld is formed in the obtained optical component. The injection speed thus need not be decreased, so that a drop in temperature of the plastic is prevented to suppress an increase in the viscosity. The transfer performance of the mold with respect to the optical surface molding surface is maintained well, so an optical component having an excellent optical performance can be obtained.

As many apparently widely different embodiments of the present invention can be made without departing from the spirit and scope thereof, it is to be understood that the invention is not limited to the specific embodiments thereof except as defined in the appended claims.

What is claimed is:

1. An optical component as a plastic molded product having an optical function, which is formed with a molding surface with a shape of a curved surface, and a flange portion between said molding surface and a gate portion, characterized in that at least part of a surface constituting said flange portion is molded to form an angular difference of not more than 15° which is substantially equal to a tangential angle to a curvature of said curved surface of said molding surface, which is near said flange portion.

2. The optical component according to claim 1, characterized in that said plastic molded product is one of an optical lens, a meniscus convex lens, and a toric lens.

3. An optical component as a plastic molded product having an optical function, which is formed with a molding surface with a shape of a curved surface, and a flange portion between said molding surface and a gate portion, characterized in that at least part of a surface constituting said gate portion is molded to form an angular difference of not more than 15° which is substantially equal to a tangential angle to a curvature of said curved surface of said molding surface, which is near said gate portion.

4. The optical component according to claim 3, characterized in that said plastic molded product is one of an optical lens, a meniscus convex lens, and a toric lens.

5. An optical component as a plastic molded product having an optical function, which is formed with a molding surface with a shape of a curved surface, and a gate portion continuous to said molding surface, characterized in that
at least part of a surface constituting said gate portion is molded to form an angular difference of not more than 15° which is substantially equal to a tangential angle to a curvature of said curved surface of said molding surface, which is near said gate portion.

6. The optical component according to claim 5, characterized in that said plastic molded product is one of an optical lens, a meniscus convex lens, and a toric lens.

7. An optical component as a plastic molded product having an optical function, which is formed with a molding surface with a shape of a curved surface, and a runner portion continuous to a gate portion of said plastic molded product, characterized in that
at least part of a surface constituting said runner portion is molded to form an angular difference of not more than 15° which is substantially equal to a tangential angle to a curvature of said curved surface of said molding surface, which is near said gate portion.

8. The optical component according to claim 7, characterized in that said plastic molded product is one of an optical lens, a meniscus convex lens, and a toric lens.

9. A method of molding an optical component as a plastic molded product having an optical function, characterized in that, of a mold having a first cavity portion having a molding surface with a shape of a curved surface having the optical function, a second cavity portion for molding a flange portion continuous to said molding surface, and a gate portion continuous to said second cavity portion, a resin injection path constituting said second cavity portion is formed to extend along a wall surface that forms an angular difference of not more than 15° which is substantially equal to a tangential angle to a curvature of said curved surface of said first cavity portion, which is near said second cavity portion, and a resin material injected through said gate portion is guided along said curved surface.

10. A method of molding an optical component as a plastic molded product having an optical function, characterized in that, of a mold having a first cavity portion having a molding surface with a shape of a curved surface having the optical function, a second cavity portion for molding a flange portion continuous to said molding surface, and a gate portion continuous to said second cavity portion, a resin injection path constituting said gate portion is formed to extend along a wall surface that forms an angular difference of not more than 15° which is substantially equal to a tangential angle to a curvature of said curved surface of said first cavity portion, which is near said second cavity portion, and a resin material injected through said gate portion is guided along said curved surface.

11. A method of molding an optical component as a plastic molded product having an optical function, characterized in that, of a mold having a cavity portion having a molding surface with a shape of a curved surface having the optical function, and a gate portion continuous to said molding portion, a resin injection path constituting said gate portion is formed to extend along a wall surface that forms an angular difference of not more than 15° which is substantially equal to a tangential angle to a curvature of said curved surface of said cavity portion, which is near said gate portion, and a resin material injected through said gate portion is guided along said curved surface.

12. A method of molding an optical component as a plastic molded product having an optical function, characterized in that, of a mold at least having a cavity portion having a molding surface with a shape of a curved surface having the optical function, a gate portion, and a runner portion, a resin injection path constituting said runner portion is formed to extend along a wall surface that forms an angular difference of not more than 15° which is substantially equal to a tangential angle to a curvature of said curved surface of said cavity portion, which is near said gate portion, and a resin material injected through said gate portion is guided along said curved surface.

13. A mold used to mold an optical component as a plastic molded product having an optical function, characterized in that said mold has a first cavity portion having a molding surface with a shape of a curved surface having the optical function, a second cavity portion for molding a flange portion continuous to said molding surface, and a gate portion continuous to said second cavity portion, and that a resin injection path constituting said second cavity portion is formed with an angle substantially equal to a tangential angle to a curvature of said curved surface of said first cavity portion, which is near said second cavity portion.

14. A mold used to mold an optical component as a plastic molded product having an optical function, characterized in that said mold has a first cavity portion having a molding surface with a shape of a curved surface having the optical function, a second cavity portion for molding a flange portion continuous to said molding surface, and a gate portion continuous to said second cavity portion, and that a resin injection path constituting said gate portion is formed with an angle substantially equal to a tangential angle to a curvature of said curved surface of said first cavity portion, which is near said second cavity portion.

15. A mold used to mold an optical component as a plastic molded product having an optical function, characterized in that said mold has a cavity portion having a molding surface with a shape of a curved surface having the optical function, and a gate portion continuous to said molding surface, and that a resin injection path constituting said gate portion is formed to extend along a wall surface that forms an angular difference of not more than 15° which is substantially equal to an angle of tangent to a curvature of said curved surface, near said gate portion, of said cavity portion.

16. A mold used to mold an optical component as a plastic molded product having an optical function, characterized in that said mold at least has a cavity portion having a molding surface with a shape of a curved surface having the optical function, and a gate portion and a runner portion, and that a resin injection path constituting said runner portion is formed to extend along a wall surface that forms an angular difference of not more than 15° which is substantially equal to a tangential angle to a curvature of said curved surface of said cavity portion, which is near said gate portion.

* * * * *

UNITED STATES PATENT AND TRADEMARK OFFICE
CERTIFICATE OF CORRECTION

PATENT NO. : 6,144,505
DATED : November 7, 2000
INVENTOR(S) : Hiroshi Nakanishi et al.

Page 1 of 1

It is certified that error appears in the above-identified patent and that said Letters Patent is hereby corrected as shown below:

Column 1,
Line 11, "can" should read -- can be used to --.

Column 2,
Line 25, "another" should read -- other --; and
Line 42, "with a size D2" should read -- (with a size D2), --.

Column 3,
Line 10, "or" should read -- and/or --, and "The" should read -- Accordingly, the --.

Column 4,
Line 1, "is" should read -- may be --;
Line 3, "is" should read -- may be --, and "lens." should read -- lens, meniscus lens, or the like --;
Line 4, "The plastic molded product is a meniscus lens." should be deleted; and
Line 5, "The plastic molded product is a toric lens." should be deleted.

Column 5,
Line 28, "which" should read -- which is --.

Column 6,
Line 40, "the" should be deleted.

Signed and Sealed this

Nineteenth Day of March, 2002

Attest:

Attesting Officer

JAMES E. ROGAN
Director of the United States Patent and Trademark Office